United States Patent
Kang et al.

(10) Patent No.: US 9,073,777 B2
(45) Date of Patent: Jul. 7, 2015

(54) METHOD AND APPARATUS FOR CUTTING A SUBSTRATE

(75) Inventors: Ji-Hyeon Kang, Yongin (KR); Hyun-Chul Lee, Yongin (KR); Won-Kyu Lim, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 211 days.

(21) Appl. No.: 13/370,572

(22) Filed: Feb. 10, 2012

(65) Prior Publication Data

US 2012/0241488 A1 Sep. 27, 2012

(30) Foreign Application Priority Data

Mar. 22, 2011 (KR) .................. 10-2011-0025405

(51) Int. Cl.
*B26F 3/00* (2006.01)
*B65H 35/10* (2006.01)
*C03B 33/033* (2006.01)

(52) U.S. Cl.
CPC .............. *C03B 33/033* (2013.01); *B26F 3/002* (2013.01); *B65G 2249/04* (2013.01)

(58) Field of Classification Search
CPC .. B28D 5/0052; B28D 5/0023; B28D 5/0029; B28D 5/0035; H05K 2201/0909; H05K 2203/302; H05K 3/0052; B26D 7/1827; B29F 3/002; C03B 33/033; B65G 2249/04; B26F 3/002

USPC ............ 225/96.5, 96, 94, 100, 101, 103, 104, 225/105, 102, 2

See application file for complete search history.

(56) References Cited

U.S. PATENT DOCUMENTS

| | | | | |
|---|---|---|---|---|
| 4,516,712 A | * | 5/1985 | Whalley | 225/96.5 |
| 5,069,195 A | * | 12/1991 | Barozzi | 125/23.01 |
| 6,019,267 A | * | 2/2000 | Shill et al. | 225/101 |
| 6,434,974 B1 | * | 8/2002 | Lisec | 65/174 |
| 7,370,783 B2 | * | 5/2008 | Hubrecht | 225/101 |
| 8,220,685 B1 | * | 7/2012 | Lindsey et al. | 225/93 |
| 2003/0155391 A1 | | 8/2003 | Chae et al. | |
| 2013/0341372 A1 | * | 12/2013 | Lee et al. | 225/2 |

FOREIGN PATENT DOCUMENTS

| | | |
|---|---|---|
| EP | 0 292 067 B1 * | 5/1988 |
| JP | 2010-189201 A | 9/2010 |
| KR | 10-2003-0040392 A | 5/2003 |
| KR | 10-2003-0069483 A | 8/2003 |
| KR | 10-2006-0000308 A | 1/2006 |
| KR | 10-2009-0078742 A | 7/2009 |

* cited by examiner

*Primary Examiner* — Sean Michalski
*Assistant Examiner* — Jonathan G Riley
(74) *Attorney, Agent, or Firm* — Lee & Morse, P.C.

(57) ABSTRACT

A substrate cutting apparatus for cutting a large size substrate into smaller unit substrates includes a rotating table and a push plate. The rotating table, on which the large size substrate having formed thereon a plurality of cutting lines is mountable, includes rotating shafts at locations corresponding to the cutting lines. The push plate fixes a position of the large size substrate on the rotating table.

16 Claims, 2 Drawing Sheets

METHOD AND APPARATUS FOR CUTTING A SUBSTRATE

CROSS-REFERENCE TO RELATED PATENT APPLICATION

This application claims the benefit of Korean Patent Application No. 10-2011-0025405, filed on Mar. 22, 2011, in the Korean Intellectual Property Office, the disclosure of which is incorporated herein in its entirety by reference.

BACKGROUND OF THE INVENTION

A substrate may be used in the fabrication process of, e.g., a flat panel display device. During the fabrication process, a large size substrate may be prepared. The large size substrate may be several folds larger than a unit substrate included in each flat panel display device. Therefore, the large size substrate may be prepared and then cut to form a plurality of the unit substrates.

SUMMARY OF THE INVENTION

Embodiments may be realized by providing a substrate cutting apparatus that includes a rotating table on which a large size substrate having formed thereon a plurality of cutting lines is mounted, wherein rotating shafts are arranged at locations corresponding to the cutting lines, and a push plate for fixing the large size substrate mounted on the rotating table.

The rotating shafts may include first rotating shafts for rotating the rotating table in a "V" form and second rotating shafts for rotating the rotating table in a reverse "V" form.

The first rotating shafts and the second rotating shafts may be arranged alternately.

The cutting lines may be alternately formed on the top surface and the bottom surface of the large size substrate.

The substrate cutting apparatus may further include a suction pump for applying suction force to the large size substrate via penetration holes formed in the rotating table.

Embodiments may also be realized by providing a method of cutting a substrate. The method including a scribing operation for forming a plurality of cutting lines on a large size substrate according to the size of a unit substrate, a fixing operation for fixing the large size substrate, on which the cutting lines are formed, on a rotating table having a plurality of rotating shafts corresponding to the cutting lines, and a cutting operation for cutting a plurality of unit substrates from the large size substrate along the cutting lines by rotating the rotating table around the plurality of rotating shafts.

The fixing operation may further include fixing the large size substrate to the rotating table by pushing the large size substrate toward the rotating table.

The method may further include applying suction force to the large size substrate via penetration holes formed in the rotating table.

The rotating table may be rotated simultaneously around the plurality of rotating shafts. Alternatively, the rotating table may be sequentially rotated around the plurality of rotating shafts.

The rotating shafts may include first rotating shafts for rotating the rotating table in a "V" form and second rotating shafts for rotating the rotating table in a reverse "V" form.

The first rotating shafts and the second rotating shafts may be arranged alternately.

The cutting lines may be alternately formed on the top surface and the bottom surface of the large size substrate in the scribing operation. The cutting lines may be sequentially formed on the top surface and the bottom surface of the large size substrate. Alternatively, the cutting lines may be simultaneously formed on the top surface and the bottom surface of the large size substrate.

BRIEF DESCRIPTION OF THE DRAWINGS

Features will become apparent by describing in detail exemplary embodiments thereof with reference to the attached drawings in which.

DETAILED DESCRIPTION OF THE INVENTION

Figure 1:
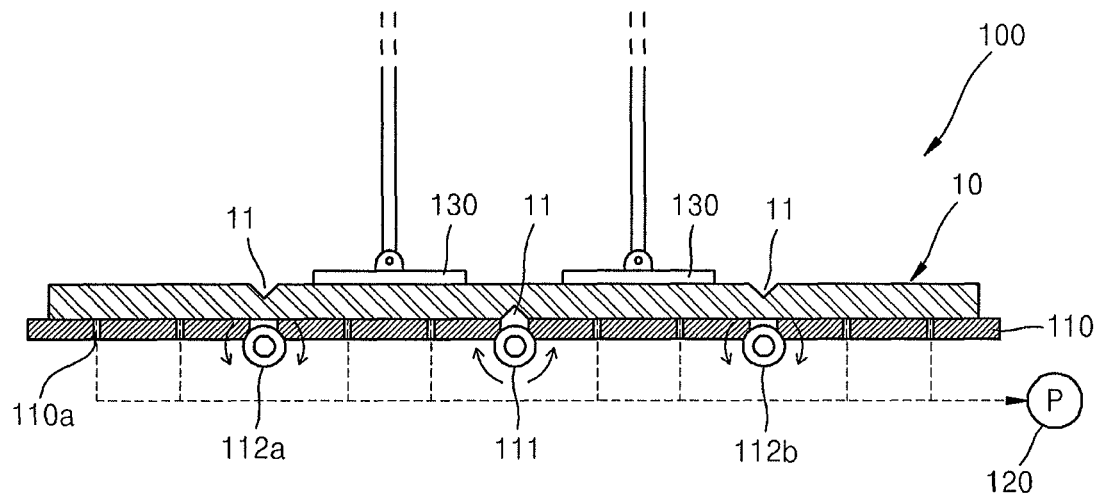
FIG. 1 illustrates a substrate cutting apparatus, according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when an element is referred to as being "on" another element, it can be directly on the element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two layers, or one or more intervening elements may also be present. Like reference numerals refer to like elements throughout.

Referring to FIG. 1, a substrate cutting apparatus 100 may be, e.g., an apparatus for cutting a hard substrate. The hard substrate may be employed in apparatuses such as a flat panel display apparatus.

The substrate cutting apparatus 100 may include a rotating table 110. The rotating table 110 may have mounted thereon a large size substrate 10 when in an operational mode. The substrate cutting apparatus 100 may include suction pump 120 for applying a suction force to the rotating table 110. For example, the suction pump 120 may apply the suction force via a plurality of penetration holes 110a in the rotating table 110. The substrate cutting apparatus 100 may include push plates 130 for fixing the large size substrate 10 to the rotating table 110 by pushing the large size substrate 10. The push plates 130 may be disposed such that the large size substrate 10, in an operational mode, is between the rotating table 110 and the push plates 130. Pressure from the push plates 130 may be applied toward a first surface of the large size substrate 10 and suction force from the suction pump 120 may be applied toward a second surface of the large size substrate 10. The first surface may oppose the second surface.

The rotating table 110 may include a plurality of rotating shafts. The rotating table 110 may be dividing into a plurality of segments, and each segment may be connected to adjacent segments by a rotating shaft. For example, the plurality of rotating shafts may include at least one first rotating shaft 111 and a plurality of second rotating shafts 112a and 112b. The first rotating shaft 111 may support and/or allow the rotating table 110 to rotate in a "V" form, e.g., to allow the segments attached thereto to move upward in a first direction. For example, the segments attached to the first rotating shaft 111 may be movable from a straight angle formation, e.g., 180° angle, to a first angular form pointing in a downward direction.

The second rotating shafts 112a and 112b may support and/or allow the rotating table 110 to rotate in a reverse "V" form, e.g., to allow the segments attached thereto to move downward in a second direction different from the first direction. For example, the segments attached to the second rotating shafts 112a and 112b may be movable from a straight angle formation to a second angular form pointing in an upward direction. Therefore, the first rotating shaft 111 may support movement of the segments in rotating table 110 in a different direction than the second rotating shafts 112a and 112b.

Figure 2:
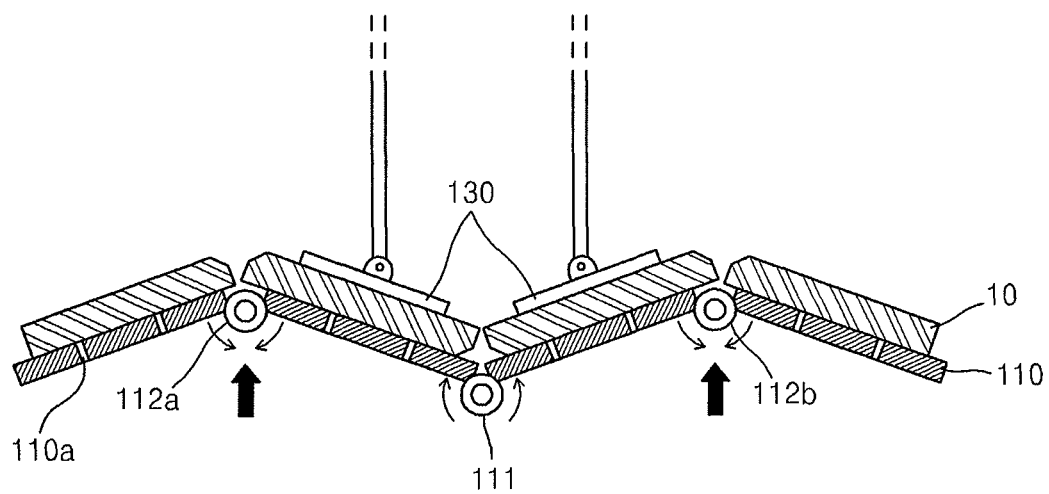
FIG. 2 illustrates an exemplary operation of the substrate cutting apparatus.

FIG. 2 shows a rotated state of the rotating table 110. As shown in FIG. 2, the first rotating shaft 111 may support the rotating table 110 to rotate in the "V" form, and the second rotating shafts 112a and 112b may support the rotating table 110 to rotate in the reverse "V" form.

However, embodiments of the rotating shafts are not limited there. Any of various structures may be employed as a structure for rotating the rotating table 110. For example, the first rotating shaft 111 may rotate at a fixed position, whereas the second rotating shafts 112a and 112b may be connected to a driving cylinder (not shown) and be elevated. As a result, the second rotating shafts 112a and 112b may be elevated up and down, and the rotating table 110 may rotate as shown in FIG. 2. In this regard the rotating shafts may be seen to be like hinges and/or articulated joints and the action thereof of the rotating table 110. Further, the rotating shafts may be configured to allow a pivoting and/or swinging action of the segments of the rotating table 110, e.g., so that the placement of each segment of the rotating table 110 is adjustable relative to positions of adjacent segments of the rotating table 110.

The large size substrate 10 may include a plurality of unit substrates applicable to actual products. Cutting lines 11 may be formed on the large size substrate 10 to define each of the unit substrates. For example, the cutting lines 11 may be formed using a scribing wheel (not shown) or a laser, (not shown) before the large size substrate 10 is mounted on the rotating table 110.

The cutting lines 11 may be alternately formed on the first surface, e.g., a top surface, and the second surface, e.g., a bottom surface, of the large size substrate 10, as shown in FIG. 1. The reason for this is based on the rotating table 110 being rotatable into a zigzag shape, e.g., the rotating table 110 may be rotatable such that adjacent segments are movable to extend in different directions from each other, as shown in FIG. 2.

The cutting lines 11 may be formed at portions, e.g., specific locations on the large size substrate 10, at which the large size substrate 10 is intended to be initially cut, For example, the cutting lines 11 may be formed on portions of the large size substrate 10 to which splitting stress is applied. In other words, in FIG. 2, splitting stress may be applied to a portion of the bottom surface of the large size substrate 10 above the first rotating shaft 111, whereas splitting stress is applied to portions of the top surface of the large size substrate 10 above the second rotating shafts 112a and 112b. The cutting lines 11 may be formed at their corresponding locations in advance.

An operation of cutting the large size substrate 10 by using the substrate cutting apparatus 100 may be performed as described follows:

First, cutting lines 11 are formed on the large size substrate 10 according to the size of a unit substrate via, e.g., scribing. The cutting lines 11 may be formed at boundaries of the unit substrates by using a scribing wheel or a laser. As described above, the cutting lines 11 may be alternately formed on the top surface and the bottom surface of the large size substrate 10.

If the scribing wheel or the laser is installed at both sides of the large size substrate 10, the cutting lines 11 may be alternately formed on the top and bottom surfaces of the large size substrate 10 at substantially the same time. As such, the cutting lines 11 may be formed on both surfaces together. If the scribing wheel or the laser is installed at only one side of the cutting lines 11, the cutting lines 11 may be formed first on the top surface or the bottom surface of the large size substrate 10 at one time, and then formed on the other surface thereafter. For example, the cutting lines 11 on the top surface may be formed first and then the cutting lines on the bottom surface may be formed thereafter. As such, the cutting lines may be formed on one surface at a time. In either case, the cutting lines 11 may be alternately formed on the top surface and the bottom surface of the large size substrate 10 according to boundaries of the unit substrates.

After the cutting lines 11 are formed, the large size substrate 10 may be mounted on the rotating table 110 of the substrate cutting apparatus 100, as shown in FIG. 1. Next, the suction pump 120 may be operated to fix the large size substrate 10 by applying suction force to the large size substrate 10 via the penetration holes 110a. The large size substrate 10 may also be firmly fixed by pushing the large size substrate 10 with the push plates 130. Locations of the cutting lines 11 and the first and second rotating shafts 111, 112a, and 112b shall be aligned, e.g., the rotating table 110 may be in an initial position in which all the segments have the straight angle formation.

Next, as shown in FIG. 2, the rotating table 110 may be rotated around the first and second rotating shafts 111, 112a, and 112b. As a result the large size substrate 10 may be cut into unit substrates along each of the cutting lines 11. For example, when the first rotating shaft 111 is rotated at a fixed position and the second rotating shafts 112a and 112b are elevated up, the rotating table 110 may rotate into a zigzag shape, as shown in FIG. 2. The zigzag shape may include an alternating arrangement of the "V" form and the reverse "V" form. Therefore, each of the cutting lines 11 may be cut, and thus, the large size substrate 10 may be cut into unit substrates.

According to an exemplary embodiment, once the large size substrate 10 is mounted on the substrate cutting apparatus 100, a plurality of unit substrates may be simultaneously cut in a single operation without needing to further move the large size substrate 10. Therefore, the cutting operation may be significantly faster. For example, the cutting operation may be faster than an operation that includes, after cutting a unit substrate from the large size substrate 10, resetting a cutting position by slightly moving the large size substrate 10 and then cutting a next unit substrate. However, according to an exemplary embodiment, once the large size substrate 10 is mounted on the substrate cutting apparatus 100, the plurality of unit substrates may be simultaneously cut in a single rotational movement of the plurality of rotating shafts. Thus, the overall work time may be reduced and productivity may be improved. Therefore, an improved substrate cutting speed and improved productivity due to the improved substrate cutting speed may be achieved.

Figure 3A:
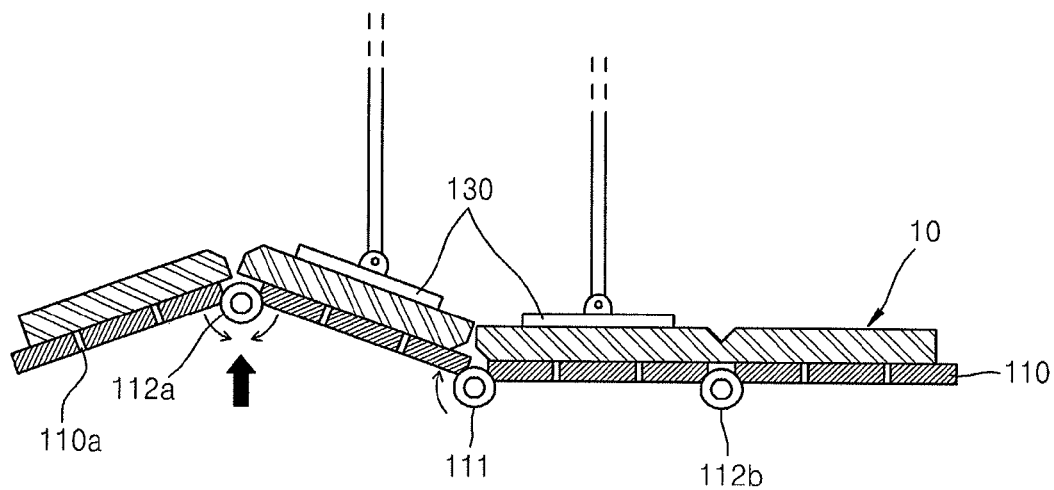
FIGS. 3A and 3B illustrate other exemplary operations of the substrate cutting apparatus.
Figure 3B:
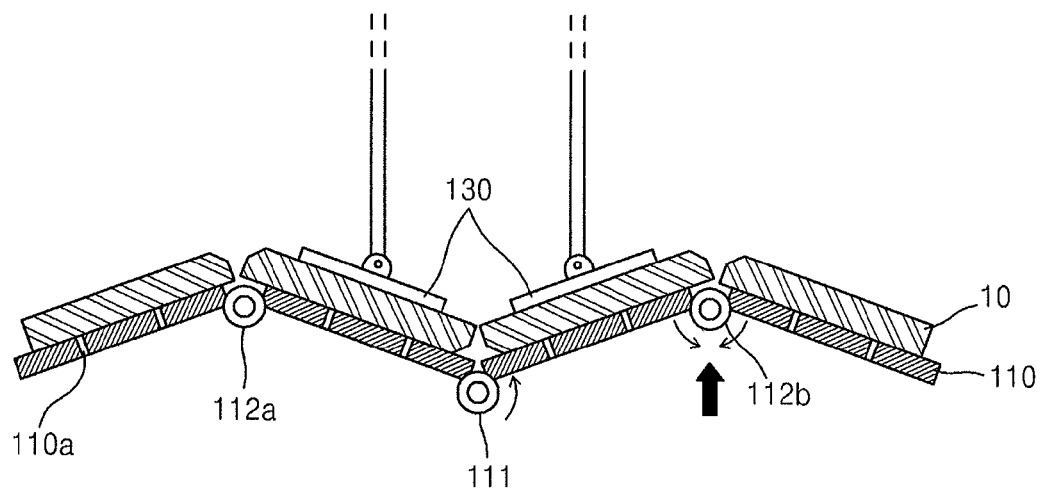

Although the above embodiment exemplifies a case in which all of the first and second rotating shafts 111, 112a, and 112b of the rotating table 110 rotate simultaneously, a cutting operation may be performed by sequentially rotating the first and second rotating shafts 111, 112a, and 112b of the rotating table 110 as shown in FIGS. 3A and 3B.

For example, as shown in FIG. 3A, while the first rotating shaft 111 is fixed at an initial position, the left second rotating shaft 112a may be elevated upwards first. As a result, two unit substrates on the left are cut first. Next, as shown in FIG. 3B, two substrates on the right are cut by elevating up the right second rotating shaft 112b. As described above, by using the method and apparatus for cutting a substrate, a cutting operation for cutting unit substrates from a large size substrate may be performed quickly and stably.

By way of summation and review, it may be necessary to perform a cutting operation to form unit substrates. Thus, a fabrication process could potentially be very slow. For example, if a large substrate is mounted on a cutting apparatus, a cutting process may include aligning a unit substrate to a cutting position, cutting the unit subtract, aligning a next unit substrate to the cutting position by slightly moving the large size substrate, and cutting the next unit substrate, and so on. Thus, this cutting operation is sequentially performed per unit substrate and the cutting operation is very slow.

Further, to reduce a thickness of a flat panel display apparatus, the thickness of substrate used therein may be reduced. Therefore, when a large size substrate is frequently moved for sequential cutting operations, the large size substrate may be damaged, e.g., scratches may be formed thereon. As such, there is demand for a smoother substrate fabrication process.

Embodiments, e.g., the exemplary embodiments discussed above, relate to a method and apparatus for cutting a substrate used in a flat panel display apparatus, and to a method and apparatus for cutting a substrate at an improved speed. Embodiments may be realized by providing a substrate cutting apparatus improved for quickly and stably performing a cutting operation for cutting unit substrates from a large size substrate, and a substrate cutting method using the substrate cutting apparatus.

A method of cutting a substrate may include a scribing operation for forming a plurality of cutting lines on a large size substrate according to the size of a unit substrate. The method may include a fixing operation for fixing the large size substrate, on which the cutting lines are formed, on a rotating table having a plurality of rotating shafts corresponding to the cutting lines. The method may include a cutting operation for cutting a plurality of unit substrates from the large size substrate along the cutting lines by rotating the rotating table around a plurality of rotating shafts, e.g., at a same time or at different times. According to the method, a cutting operation may be performed significantly faster. Furthermore, it is not necessary to move a large size substrate a plurality of times during a cutting operation, and thus a risk of product damages may be reduced.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A substrate cutting apparatus for cutting a large size substrate into smaller unit substrates, the apparatus comprising:
   a rotating table on which the large size substrate having formed thereon a plurality of cutting lines is mountable, the cutting lines being spaced apart from each other by a predetermined distance, the rotating table including a plurality of spaced apart rotating shafts at locations aligned with the cutting lines, the rotating shafts being spaced from each other a distance corresponding to the predetermined distance that the cutting lines are spaced from each other; and
   a number of push plates, each of the push plates to apply a pressure to the large size substrate on the rotating table, wherein the number of push plates is less than the plurality of cutting lines and wherein:
   a first cutting line is on a first surface of the large size substrate, and second and third cutting lines are on a second surface of the large size substrate,
   the first cutting line is between adjacent push plates,
   the adjacent push plates are between the second and third cutting lines, and
   the rotating table rotates in a first direction at a first location to separate the large size substrate along the first cutting line, and rotates in a second direction opposite to the first direction at second and third locations to respectively separate the large size substrate along the second and third cutting lines.

2. The substrate cutting apparatus of claim 1, wherein the plurality of spaced apart rotating shafts includes:
   a first rotating shaft at the first location for rotating the rotating table in the first direction about a first axis of rotation into a first angular position, the first rotating shaft corresponding with the first axis of rotation of the rotating table, and
   second rotating shafts at the second and third locations, each of the second rotating shafts for rotating the rotating table in the second direction about second axes of rotation into a second angular position, the second rotating shafts corresponding with the second axes of rotation of the rotating table.

3. The substrate cutting apparatus of claim 2, wherein the first rotating shaft and the second rotating shafts are alternately arranged on the rotating table.

4. The substrate cutting apparatus of claim 1, further comprising
   a suction pump for applying suction force via penetration holes in the rotating table toward the large size substrate mountable on the rotating table.

5. A method of cutting a substrate, the method comprising:
   performing a scribing operation to form a plurality of cutting lines on a large size substrate according to a size of a plurality of smaller unit substrates to be formed;
   performing a fixing operation using a number of push plates for fixing the large size substrate, on which the cutting lines are formed, to a rotating table, the rotating table having a plurality of rotating shafts corresponding to the cutting lines; and
   performing a cutting operation for cutting the plurality of smaller unit substrates from the large size substrate along the cutting lines by rotating the rotating table around the plurality of rotating shafts, wherein the number of push plates is less than the plurality of cutting lines and wherein:

a first cutting line is on a first surface of the large size substrate, and second and third cutting lines are on a second surface of the large size substrate, the first cutting line is between adjacent push plates, the adjacent push plates are between the second and third cutting lines, and the rotating table rotates in a first direction about a first shaft to separate the large size substrate along the first cutting line, and rotates in a second direction opposite to the first direction about second shafts to separate the large size substrate along the second and third cutting lines.

6. The method of claim 5, wherein the fixing operation further comprises fixing the large size substrate to the rotating table by pushing the large size substrate toward the rotating table.

7. The method of claim 6, further comprising applying suction force to the large size substrate via penetration holes in the rotating table.

8. The method of claim 5, wherein the rotating table is rotated simultaneously around the plurality of rotating shafts.

9. The method of claim 5, wherein the rotating table is rotated around ones of the plurality of rotating shafts at different times.

10. The method of claim 5, wherein the:

the rotating table rotates about the first shaft into a first angular disposition pointing in the first direction, and the rotating table rotates into a second angular disposition pointing in the second direction about the second shafts.

11. The method of claim 10, wherein the first rotating shafts and the second rotating shafts are alternately arranged on the rotating table.

12. The method of claim 5, wherein the scribing operation includes alternately forming the cutting lines on the first surface and the second surface of the large size substrate and wherein the first surface is a top surface and the second surface is a bottom surface of the large size substrate.

13. The method of claim 12, wherein the cutting lines are sequentially formed on the top surface and the bottom surface of the large size substrate.

14. The method of claim 12, wherein the cutting lines are simultaneously formed on the top surface and the bottom surface of the large size substrate.

15. The substrate cutting apparatus of claim 1, wherein the plurality of rotating shafts include:

a first rotating shaft for rotating the rotating table in a "V" form facing a first direction, and second rotating shafts for rotating the rotating table in a reverse "V" form facing a second direction, wherein the first direction is opposite to the second direction.

16. The substrate cutting apparatus of claim 1, wherein the first surface is a top surface and the second surface is a bottom surface of the large size substrate.

\* \* \* \* \*